H. E. SMYSER.
Package Making and Filling Machine.

No. 227,185.   Patented, May 4, 1880.

H. E. SMYSER.
Package Making and Filling Machine.

No. 227,185.  Patented May 4, 1880.

H. E. SMYSER.
Package Making and Filling Machine.

No. 227,185. Patented May 4, 1880.

Witnesses:
James B. Stewart
Mattie B. Stewart

Inventor:
Henry E. Smyser
By J. J. Stewart
his Attorney

H. E. SMYSER.
Package Making and Filling Machine.

No. 227,185. Patented May 4, 1880.

H. E. SMYSER.
Package Making and Filling Machine.

No. 227,185. Patented May 4, 1880.

Witnesses:
James B. Stewart
Mattie B. Stewart

Inventor:
Henry E. Smyser
By J. J. Stewart,
his Attorney

H. E. SMYSER.
Package Making and Filling Machine.

No. 227,185.  Patented May 4, 1880.

Witnesses:  Inventor:

H. E. SMYSER.
Package Making and Filling Machine.

No. 227,185. Patented May 4, 1880.

Witnesses:
F. L. Durand
C. L. Emit

Inventor:
H. E. Smyser
By J. J. Stewart
Atty.

UNITED STATES PATENT OFFICE.

HENRY E. SMYSER, OF PHILADELPHIA, PENNSYLVANIA, ASSIGNOR TO WEIKEL & SMITH SPICE COMPANY OF PHILADELPHIA.

PACKAGE MAKING AND FILLING MACHINE.

SPECIFICATION forming part of Letters Patent No. 227,185, dated May 4, 1880.

Application filed November 12, 1879.

*To all whom it may concern:*

Be it known that I, HENRY E. SMYSER, of Philadelphia, in the county of Philadelphia and State of Pennsylvania, have invented certain new and useful Improvements in Package Making and Packing Machines; and I do hereby declare the following to be a full, clear, and exact description thereof, reference being had to the accompanying drawings, and to the letters of reference marked thereon.

The nature of my invention consists in the construction and arrangement of a machine for making packages of paper or other suitable material for dry-packing, and at the same time filling the said packages with weighed or measured quantities of ground spices, mustard, snuff, or other powdered or granulated articles, closing up the contents within said packages, pasting the same, and drying them while passing through a tube to a receptacle prepared to receive them, all as hereinafter more fully set forth.

In order to enable others skilled in the art to which my invention appertains to make and use the same, I will now proceed to describe its construction and operation, referring to the annexed drawings, which form a part of this specification, and in which—

Fig. 7½ is a section thereof with top and bottom slides.

A' represents the frame of my machine, which may be made of metal or wood, or both combined, and constructed in any suitable or convenient manner to contain the various operating parts.

On one side of the frame A' is a train of gearing, B', which may be operated by hand or other power for imparting a continuous rotary motion to a horizontal shaft, C', near the rear end of the frame. This shaft C', through the medium of a longitudinal shaft, E', and suitable bevel-gears, communicates motion to a vertical shaft, D', at the front end, near one side of the machine. A similar vertical shaft, D', is near the other side of the machine, a shaft, F', at the top, and another (the one which carries the cam $m^5$) at the bottom, the said shafts being all geared together so as to have the proper rotary motions.

The shafts C', D' D', F', and G' are provided with cams, from which all the various moving parts are operated.

Figures 1, 2, 3, 4:
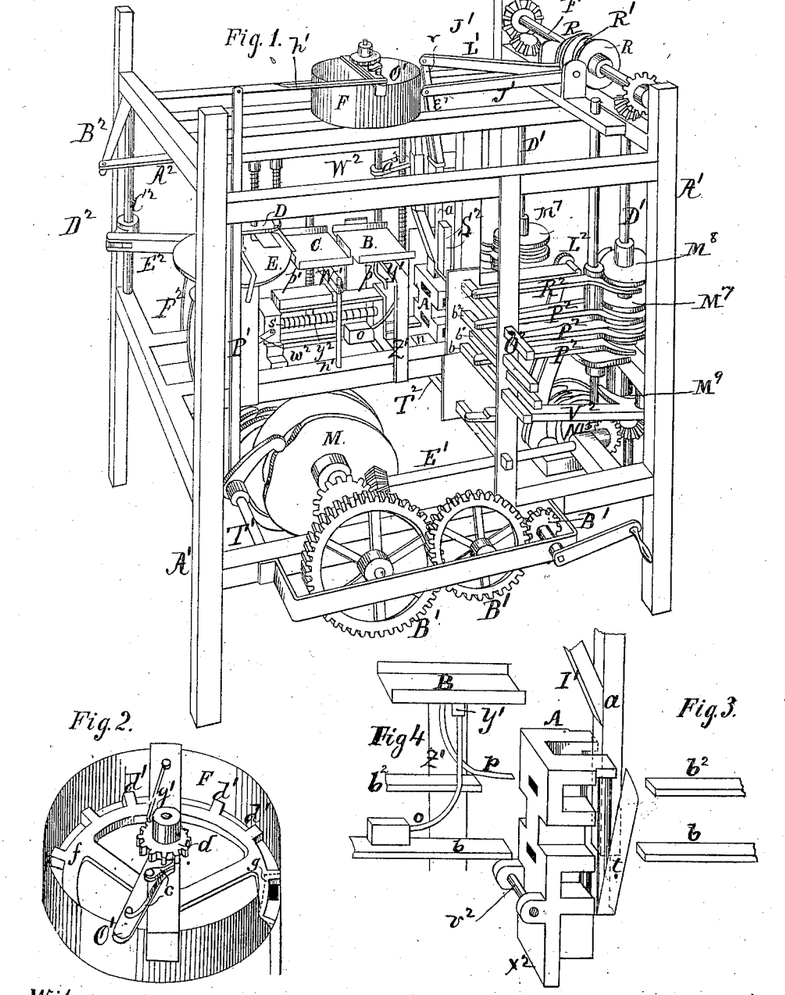
Figure 1 is a perspective view of the entire machine.
Fig. 2 is a detailed perspective view of the measuring device.
Fig. 3 is a detailed view of the mold or matrix.
Fig. 4 is a detailed view of the tilting table for depositing the paper in the mold.
Figure 5:
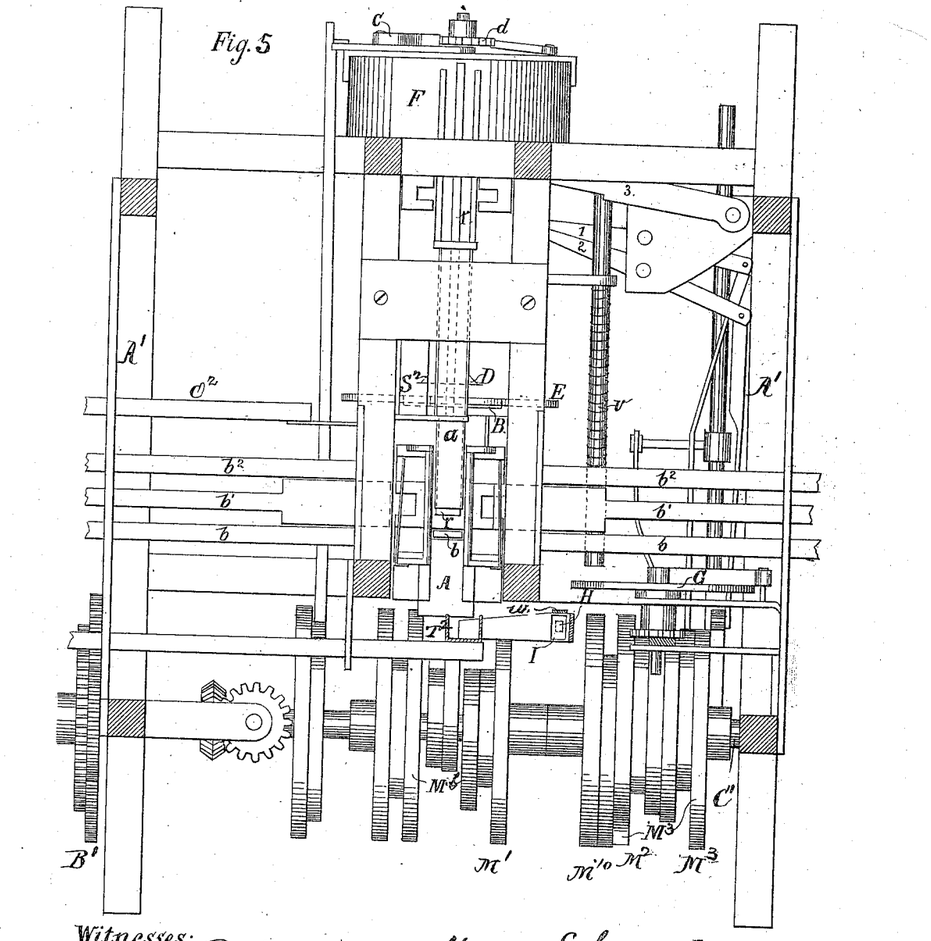
Fig. 5 is a central vertical cross-section of the entire machine.
Figure 6:
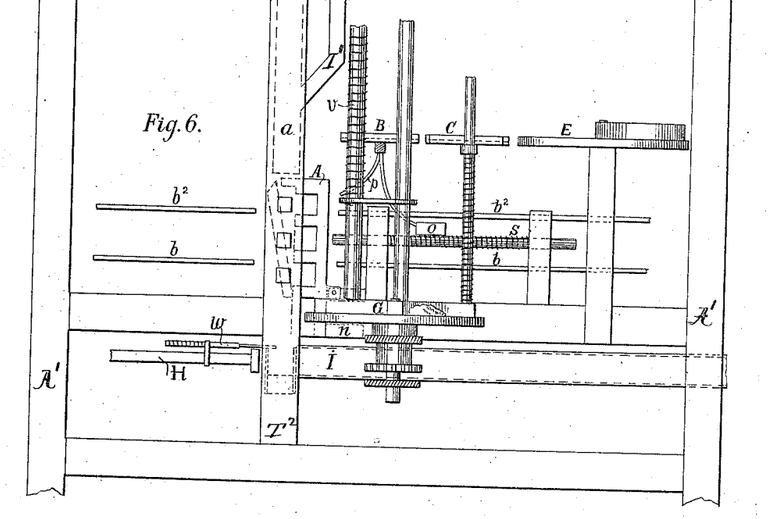
Fig. 6 is a partial side elevation of the machine, showing the mold, the device for pasting top of package, and the drying-tube.
Figure 7:
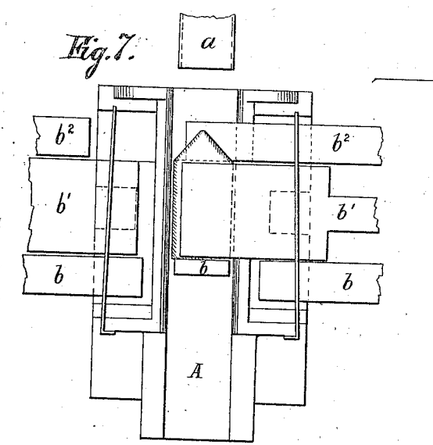
Fig. 7 is a front view of the mold or matrix with the side slides.
Figure 8:
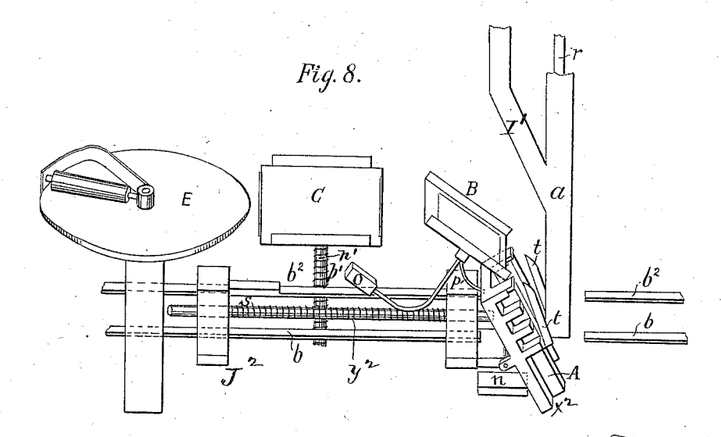
Fig. 8 is a detailed perspective view, showing the pasting-disk, paper-holder, tilting table, and mold or matrix.
Figure 9:
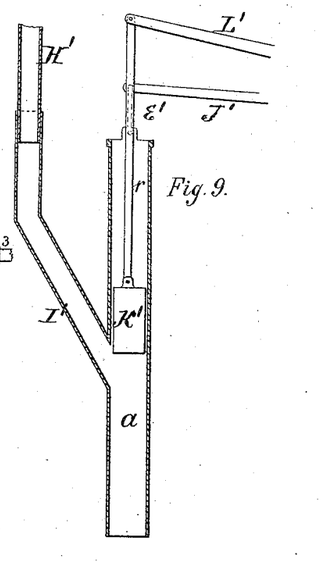
Fig. 9 is a vertical section of the funnel or plunger.

On top of the machine is a stationary hopper, F, for containing the article to be measured and packed. On the bottom of this hopper is a revolving wheel, *f*, provided on its circumference with projections *d'*, at such distances apart as to contain between them the exact quantity to be deposited and packed in each package. These projections extend to the inner circumference of the hopper, so as to draw the measured quantities in succession to the front side under a cut-off, *g*, and allow the same to drop into a conductor or spout, H'. Over the lower end of this spout is placed a conductor, I', of the angular form shown in Fig. 9, and which leads into the vertical funnel *a*. This funnel is of the desired shape for package, and its upper end is by rods *e' e'* connected with two levers, J' J', the front ends of which are operated by means of two cams, R R, upon the shaft F', one to raise the funnel and the other to lower the same, thus giving a positive movement to the funnel in both directions.

Within the funnel a is a plunger or piston, K', connected by a rod, r, with a lever, L', pivoted between the two levers J', and operated by cams R' between the cams R on the shaft F'. The front end of the lever L' has two prongs, on which the cams R' operate so as to give a positive motion to the plunger, also in both directions.

The revolving wheel f in the hopper is attached to an upright shaft, on which is secured a ratchet-wheel, d, and a lever, O', placed loosely on said shaft, carries a spring-pawl, c, to take into the ratchet-wheel, and by a proper movement of said lever turns the wheel the required distance for discharging one of the measured quantities. A spring, g', taking into the ratchet-wheel, prevents any backward movement of the wheel f.

The outer end of the lever O' is, by a rod, h', connected with a lever, P', which is pivoted on a rod or shaft, T', in rear of the shaft C'. The lower end of the lever P' has two prongs, which are operated upon by a double cam, M, secured on the shaft C', whereby the lever O' is moved positively at the proper times in both directions.

E represents a revolving disk for holding the paste and distributing the same over its surface in such proper thickness as adapts it to supply the carrier. This disk is made of metal, and secured upon a vertical shaft, which is rotated intermittently by means of a ratchet-wheel, i', pawl k', and lever R'. This lever is worked by means of a slotted guide, S', which is attached to the rod m', that connects the upper rear horizontal slide, $b^2$, with its operating-lever V'. This lever is also pivoted on the shaft T', and its lower end double-pronged to be operated positively in both directions by means of a double cam, M' on the shaft C'.

The guide S', being slotted, allows the slide $b^2$ to move in either direction a certain distance before the lever R' is operated to turn the paste-disk E, as the travel of said slide is much longer than the distance necessary to rotate the disk each time.

C is the platform for receiving the sheets of paper ready to be pasted, picked up, and transferred by the carrier D to the tilting table B. This platform is preferably made of metal, flat-bottomed, and with side flanges to keep the sheets of paper from falling off. It is located immediately in front of the paste-disk E, and is secured to a horizontal bar, W', through each end of which passes a stationary vertical rod, n', and the bar supported at one or both ends by a spiral spring, p', encircling the rod. By these springs, or the single spring, the platform is eased under the pressure of the carrier when the same comes down upon it for a sheet of paper.

The tilting plate or table B is located immediately in front of the platform C, and is preferably made of metal, with its side edges slightly turned up so as to keep the sheet of paper from falling off on the sides. It rests upon a bar, Y', pivoted at each end in an upright, Z', attached to the frame of the machine, so that the plate can be tilted and restored to a level position as required.

Attached to the said plate or to the pivoted bar is a forwardly-bent rod, p, against which the back of the matrix A strikes when the same is receding, so as to tilt the plate forward. There is also attached to said plate or bar a curved weighted lever, o, bent in the opposite direction, which serves to restore and hold the plate B to its proper level when the pressure is removed from the rod p.

Figure 10:
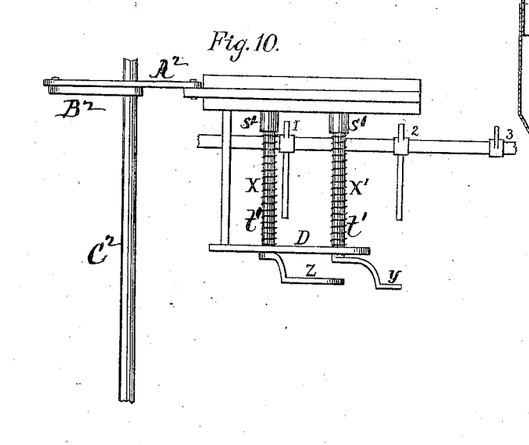
Fig. 10 is a side view of the paster and paper-carrier.

The carrier D is shown in detail in Fig. 10, and consists of a metal block with L-shaped frame projecting downward from the same. The block or upper part of the carrier moves backward and forward in suitable horizontal guides formed in the top of the frame of the machine. It is, by a pivoted link, $A^2$, connected with a horizontal arm, $B^2$, secured on a vertical shaft, $C^2$, at one corner of the machine. This shaft is further, by a suitable arm, $D^2$, and link $E^2$, connected with a lever, $F^2$, pivoted on the shaft T', and the lower end of this lever is pronged to be operated upon by a double cam, $M^2$, on the shaft C', and thus give a positive motion in both directions to the carrier.

The double cam $M^2$ is so constructed that the carrier D will be at rest directly over the paste-disk E; then be moved forward and held at rest over the receiving-platform; then be moved still farther forward and be at rest directly over the tilting plate B, and, finally, in one motion, be moved back to a position over the paste-disk again.

In the carrier D are two rods, x x', each provided with a collar, s', and between said collar and the lower part of the carrier-frame there is a spiral spring, t', encircling each rod. The rear rod, x, carries on its lower end a foot, z, and the front rod, x', a narrow angular foot, y, which latter serves to take up paste from the disk E, apply it on the paper, and lift the paper up for carrying it to the tilting plate B, while the foot z serves to detach the paper from the foot or lifter y.

In suitable bearings at one side of the machine are two shafts, $G^2$ $H^2$, one above the other. The lower shaft, $G^2$, has three arms, 1, 2, and 3, while the upper shaft, $H^2$, has one arm, 4, all extending inward for the purpose of bearing down upon projections on the collars $s^2$ and pressing down the spring-rods x x' at the proper times. The two shafts $G^2$ $H^2$ are, by suitable arms and links, connected with two levers, $I^2$ $I^2$, which are pivoted on the shaft T', and are operated by cams $M^3$ on the shaft C', said cams being constructed to turn the shafts $G^2$ $H^2$ and work their arms in the following manner: When the carrier D stands at rest over the disk E, the arm 1 presses down the rod $x'$, so that the angular lifter $y$ will come down on the paste, and as the arm rises the lifter $y$ is also raised by the spring on its rod. When the carrier then is at rest over the platform C, the arm 2 in like manner depresses the lifter $y$, which then comes down on the top sheet of paper and applies the paste along two edges of the paper, and as the lifter $y$ rises again the top sheet is lifted by it and carried during the next forward movement of the carrier to a position over the tilting plate B. Here the arm 3 again presses down the foot $y$ until the sheet of paper is laid on the plate B.

It will be noticed that the detacher $z$ is depressed each time with the lifter $y$ by the lower end of the rod $x'$ coming down thereon; but the last time the lifter is depressed—that is, when laying the sheet of paper on the tilting table—the arm 4 comes in play and holds the detacher $z$ down while the lifter $y$ rises again, thus stripping the paper from the lifter and causing it to remain on the table. When the arm 4 rises the detacher $z$ is moved up again by the spring on its rod.

If the levers $I^2 I^2$ are not heavy enough to return the shafts $G^2 H^2$ with their respective arms to their proper positions after having operated as above, I may arrange one or more springs in any suitable or convenient manner to do so.

A represents the mold or matrix, consisting of a metal block provided at the front with a vertical groove or recess of the shape desired for the outside of the package to be formed therein, which generally is the ordinary shape of a spice-package, flat-sided, square-edged, of greater length than breadth, and less in depth than either. In order to give this shape to the package I have perforated the matrix-block at proper distances above and below with holes or slots, through which slides are thrust at proper intervals to close the top and bottom of the package.

The matrix A is hinged on a rod, $v^2$, in a horizontally-reciprocating carriage, $J^2$, which is connected by a link, $w^2$, with a lever, $K^2$, pivoted upon the shaft T′, and having its lower end pronged to be operated upon by a cam, $M^4$, on the shaft C′, so as to give a positive motion to said carriage in both directions.

The matrix is held in a perpendicular position until a bottom projection, $x^2$, thereon is, during the backward movement of the carriage $J^2$, brought against a stop, $u$, when it will incline backward at the same time as the table or plate B is tilted forward, and the sheet of paper previously deposited on said plate will slide down to the face of the matrix. On each side of this matrix is a guard, $t$, to hold the sheet of paper in position until the forward movement of the matrix brings it against the outside of the funnel $a$, which acts as a forming-block, around which the paper is made into box shape by the matrix and a series of slides hereinafter described.

Through the carriage $J^2$ is passed a horizontal rod, $s$, which is held thrust forward by a spiral spring, $y^2$, surrounding the same. This rod recedes before the pressure of the matrix while the same is being tilted during its rearward movement, and when the matrix moves forward again the spring causes the rod $s$ to restore the matrix to its perpendicular position.

Three sets of slides are used to form and close the package after the matrix has moved forward around the funnel $a$, the paper then being around three sides of the funnel in the vertical groove or recess in the matrix. The fourth side or back of the package is closed by means of two flat slides, $b' b'$, coming one from each side. The bottom is closed by four slides, $b$, coming one from each side, one from the front, and one from the back, and in like manner the top is closed by four slides, $b^2$, similarly situated.

The two front slides are operated by means of levers $L^2$ and cams $M^5$ on the shaft G′; and said slides pass through stationary bearings on the machine-frame.

The upper rear slide, $b^2$, is operated by the lever V′, as mentioned above, while the lower rear slide, $b$, is operated by a lever, $N^2$, and a cam, $M^6$, on the shaft C′.

The three slides $b\ b'\ b^2$ on each side are each operated by means of a pivoted lever, $P^2$, actuated by a cam, $M^7$, on the vertical shafts D′, and the various cams and levers are so timed and arranged that the different slides will be moved just at the proper moments.

The slides $b' b'$ first move in to fold the sides together, and then the lower slides, $b$, move inward to fold the bottom, and the folds adhere together by reason of the paste previously put on the paper. As soon as the slides $b$ have moved inward the measured quantity of the article in the hopper passes into the funnel and into the package formed in the matrix A. The plunger K′ then descends and presses down upon the said ground spices, compressing them carefully and completely into the package. Immediately thereafter a slide, $O^2$, is moved inward by a lever, $R^2$, actuated by a cam, $M^8$, on the shaft D′, and passes through the bottom of a card-box, $S^2$, which is attached to the side of the funnel $a$. The plunger K′ having in the meantime been raised, the slide $O^2$ pushes the bottom card from the box $S^2$ through a slot in the funnel $a$, so as to come down and rest upon the top of the as yet unclosed package of spices, thereby making a convenient hard surface over which to fold that end of the package. The funnel $a$ is now withdrawn, and the slides $b^2$ are then moved inward, folding the upper end of the package in a neat fold over the piece of card-board. As these slides are withdrawn the plunger K′ immediately descends again through the matrix A, closing the end of the package and pushing it into a receiver, T², below, by which it is conveyed laterally to the mouth of the drying-tube I, through which the packages are afterward pressed by the plunger H. The receiver T² is moved by means of a pivoted arm or lever, V², operated by a cam, M⁹, on the shaft D'.

Figure 11:
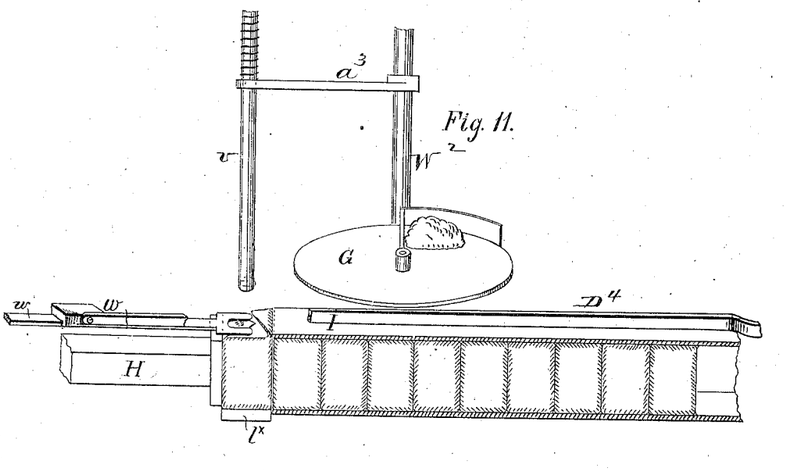
Fig. 11 is a detailed view of the device for operating pasting mechanism and folding top of package, and the drying-tube.
Figure 12:
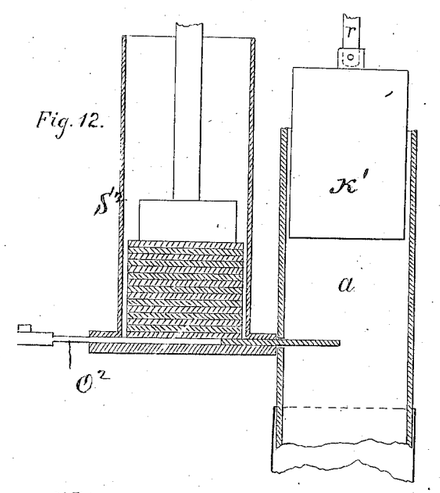
Fig. 12 is a section of the card-box and means for pushing one card over the material in the package.
Figure 13:
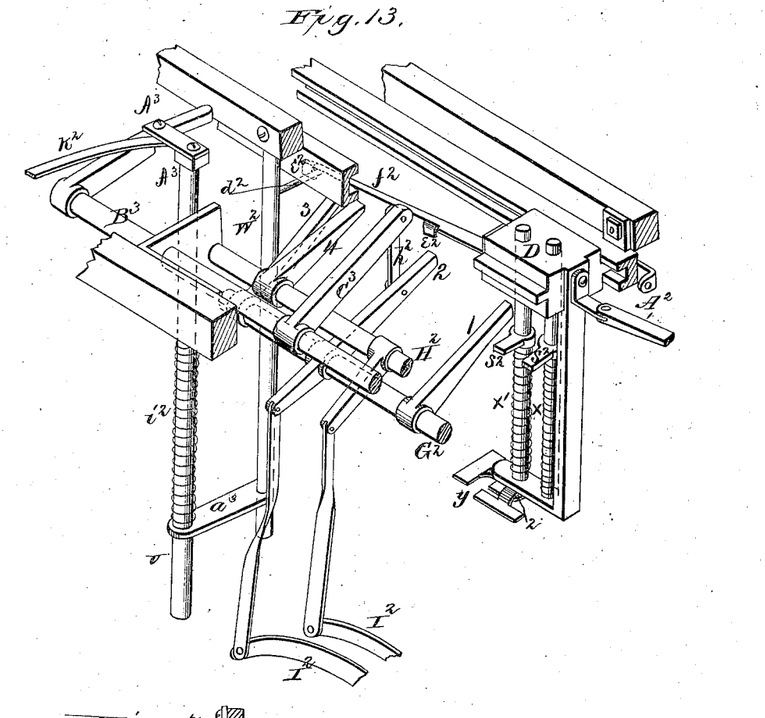
Fig. 13 is a perspective view, showing the mechanism for operating the lifter and detacher.
Figure 14:
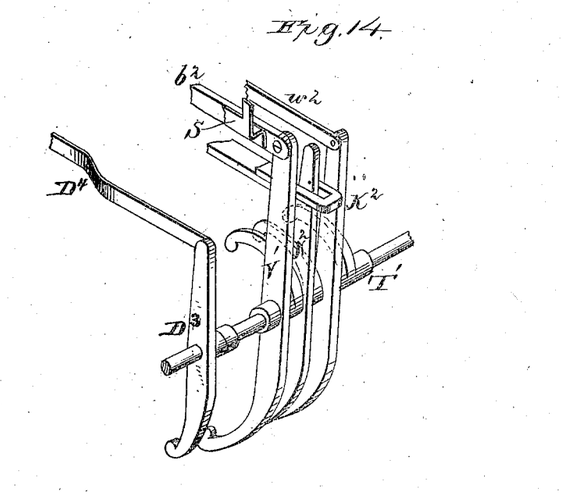
Fig. 14 is a perspective view of certain cams and levers.
Figure 15:
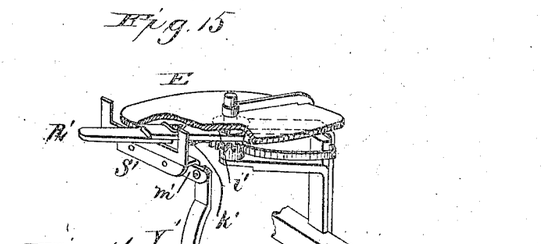
Figs. 15 and 16 are detailed views, showing the paste-disk E and the mechanism for operating the same.
Figure 16:
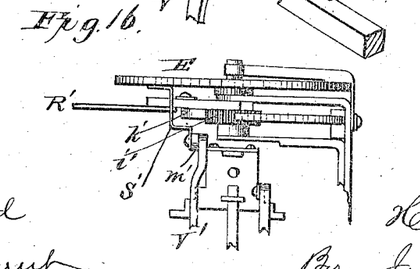
Figure 17:
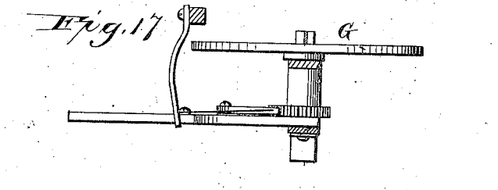
Fig. 17 shows the disk G.

While the package remains at the mouth of the drying-tube I a little paste is taken from off the revolving disk G, which is similar in construction to the revolving disk E, and for a like purpose, and may be seen in detail in Fig. 11, the lever carrying the pawl for rotating said disk being connected to and operated by the lower slide, b, on that side of the machine.

The paste is taken from the revolving disk G by the paster v, which is a perpendicular rod passing through two horizontal arms, a³, projecting from a vertical shaft, W². This shaft is further provided with an inwardly-projecting arm, d², upon which act two lugs, c², on the under side of an arm, f², that projects from the carrier D.

During the forward movement of the carrier the shaft W² is turned so as to bring the rod or paster v over the table G, and during the backward movement of said carrier the shaft is turned to bring the paster directly over the package at the mouth of the tube I. The rod is pressed down while in both positions—in one taking paste and in the other delivering paste—by means of arms A³ A³, attached to a rocking shaft, B³. This shaft is turned by having an arm, C³, thereon connected by a link, h², with the arm 2 on the shaft G². The arms A³ will therefore go down at the same time as the arm 2 and press down the paster v. A spring, k², raises the arms A³ again, and a spiral spring, i², raises the paster.

When the receiver T² arrives at the mouth of the tube I, it remains there, and a slide, w, holds the end of the package in position while the paster v applies the paste on the end of the package and rises again. The slide w then recedes, leaving the package in position ready for the plunger H, which then advances and presses it into the tube I, thus closing the package effectually and pressing the finished packages forward through the drying-tube I to the receptacle at the end thereof prepared to receive them.

The plunger H is connected with and operated by the same lever which operates the lower front slide, b, and the slide w is connected by a rod, D⁴, with a lever, D³, on the shaft T', which is operated by a cam, M¹⁰, on the shaft C'.

The operation of the machine can be briefly recapitulated as follows: The sheets of paper having been placed on the receiving-table C and the ground spices in the hopper F, as well as paste on the rotating disks E and G, the machine is ready for work. The lifter y descends and receives paste, and rises again, is then moved forward, descends to pick up one sheet of paper, and rises. It is then moved farther forward and descends and rises while the detacher delivers the pasted sheet of paper on the tilting table. The carrier, with the lifter and detacher, then returns to go through the same operation again. In the meantime the table has tilted forward and the sheet of paper fallen down over the face of the matrix, which had been moved backward and tilted backward to correspond with the tilting table. As the matrix then moves forward and resumes an upright position the tilting table resumes its level position. The matrix moving forward fits around the spice-funnel, which acts as a former for the package. The sides and bottom of the package are then folded, the package filled from the hopper by a measured quantity of spices, which are rammed down by the plunger. The plunger rises, a card is pushed in over the spices, and the top of the package closed after the funnel is raised. Funnel and plunger now descend again and force the package into a receiver below, when the funnel and plunger rise again. The receiver carries the package to the side in front of a drying-tube, where the package is held by a slide while paste is applied on the end. A plunger then forces the package into the drying-tube, through which it is gradually forced by succeeding packages.

The various parts of the machine are so timed that about the time when the sides and bottom of one package are being folded the lifter will descend to take up paste for the next sheet of paper.

Having thus fully described my invention, what I claim as new, and desire to secure by Letters Patent, is—

1. A mold or matrix, A, for the formation of paper packages and holding of the same while being packed, provided at proper intervals with slots, in combination with reciprocating slides and a forming-block, whereby the lower ends and sides are closed first and then the upper end also closed after package is filled.

2. The vertically-reciprocating funnel a, in combination with the internal reciprocating ram or plunger, K', and the mold or matrix A, substantially as and for the purposes herein set forth.

3. The slides b b' b², in combination with the matrix A and the vertically-reciprocating funnel a, with its internal reciprocating ram or plunger, K', all arranged to operate substantially as and for the purposes herein set forth.

4. The tilting plate B, provided with the curved rod p and weighted lever o, in combination with the reciprocating and tilting matrix A, substantially as and for the purposes herein set forth.

5. The carrier D, with its paster and lifter y and detacher z, respectively attached to and operated by the two upright bars or rods x' x and their surrounding spiral springs, substantially as and for the purposes herein set forth.

6. The combination of the hinged mold or matrix A, reciprocating carriage $J^2$, the stop $n$ for tilting the matrix, and the rod $s$, with spring $y^2$, for returning it to a perpendicular position, substantially as herein set forth.

7. The combination of the reciprocating tilting matrix A and the tilting table or plate B, operated by the movement of the matrix, substantially as and for the purposes herein set forth.

8. The combination of the matrix A, tilting plate B, receiving-platform C, revolving disk E, and sliding frame or carriage $J^2$ with spring-rod $s$, all substantially as and for the purposes herein set forth.

9. The shafts $G^2$ $H^2$, with the arms 1, 2, 3, and 4, operated by means of levers and cams, as described, in combination with the carrier D, with its spring-rods $x$ $x'$, lifter $y$, and detacher $z$, substantially as and for the purposes herein set forth.

10. The card-box $S^2$, with its slide $O^2$, operated by a lever and cam, in combination with the matrix, reciprocating funnel, and package-making slides, substantially as described.

11. The combination of the carrier $T^2$, slide $w$, paste-disk G, and the paster $v$, with its operating mechanism, substantially as and for the purposes herein set forth.

12. The revolving disk G, paster $v$, slide $w$, plunger H, drying-tube I, and carrier $T^2$, constructed and combined to operate in a package making and packing machine, substantially as and for the purposes herein set forth.

13. The combination, in a package making and packing machine, of a revolving disk for distributing paste, a carrier for pasting and conveying the paper, a tilting table for shifting the paper, a mold movable horizontally and into an inclined position, a reciprocating funnel for forming and filling the package, slides for closing the same, a measuring-hopper for measuring the material, a reciprocating plunger adapted to press the package and also to discharge it from the mold, a laterally-operating carrier, a pasting device for pasting, and a slide for holding the top end of the package, a drying-tube, and a plunger for discharging the complete packages through said tube, all substantially as shown and described.

In testimony whereof I hereto append my signature this 20th day of October, 1879.

HENRY E. SMYSER.

Witnesses:
GEO. W. WEIKEL,
THEOP. H. SMITH.